May 14, 1957 H. REDLICH ET AL 2,792,455

RECORDING APPARATUS

Filed Jan. 14, 1955 2 Sheets-Sheet 1

INVENTORS:
HORST REDLICH AND
WERNER SCHMACKS
BY
Michael S. Striker
Agt.

INVENTORS:
HORST REDLICH AND
WERNER SCHMACKS
BY
Michael S. Striker
Agt.

2,792,455
Patented May 14, 1957

1

2,792,455

RECORDING APPARATUS

Horst Redlich, Berlin-Steglitz, and Werner Schmacks, Berlin-Wilmersdorf, Germany, assignors to Teldec Schallplatten G. m. b. H., Hamburg, Germany Application January 14, 1955, Serial No. 481,947

Claims priority, application Germany January 21, 1954

9 Claims. (Cl. 179—100.1)

The present invention relates to recording apparatus. More particularly, it relates to a method and apparatus for controlling the distance between adjacent grooves of a record during the recording of a sound track thereon.

When recording sound tracks on a record made in the form of a disc or a cylinder, the amount of usable space of the record is limited by the physical size thereof. The space is used by recording the sound track in the form of a continuous helix. If a very small distance is provided between the adjacent grooves of the helix, the length of the helix will be substantially longer than if a large distance is provided between the adjacent grooves, for the same size record. However, the distance between the adjacent grooves is limited by the amplitude of the sound tracks recorded in the grooves.

If it is desired to permit a wide variation of volume in the sound track, it is apparent that a wide space must be left between adjacent grooves. That is, the space must be large enough to permit the recording of two sound tracks having the largest amplitude in adjacent sound tracks without these tracks running into each other. However, since the sound tracks will have only the largest permissible amplitude for very short time periods, leaving a constant large space between all the grooves will waste most of the available space on the record and the length of the helix will be substantially smaller than desired.

On the other hand, by means of the present invention the distance between the center lines of the adjacent grooves is automatically varied depending upon the amplitude of the sound track to be recorded as well as the amplitude of the sound track which already has been recorded in the adjacent groove.

Accordingly, it is an object of the present invention to provide a new and improved method and apparatus for controlling the distance between adjacent grooves of a record during the recording of a sound track thereon.

Another object of the present invention is a new and improved method and apparatus for automatically varying the distance between the center lines of adjacent grooves of a record in accordance with the amplitude of the sound track to be recorded and the amplitude of the sound track recorded in the adjacent groove.

A further object of the present invention is to provide a new and improved method and apparatus for controlling the position of the recording head during the recording of a sound track on a record.

Still another object of the present invention is to provide new and improved driving means for positioning the recording head of a recording apparatus during the recording of a sound track on a record.

With the above objects in view, the present invention mainly consists in an apparatus for positioning the recording head of a recording apparatus to control the distance between adjacent grooves of a record during the recording of a sound track thereon, comprising, in combination, means for producing voltage signals corresponding to the sound track to be recorded, impulse forming means responsive to the voltage signals for forming two series of impulses, one of the series of impulses corresponding to the positive portions of the voltage signals and the other of the series of impulses corresponding to the negative portions of the voltage signals, the impulse forming means having an output, modulating means connected to the output of the impulse forming means for modulating each of the series of impulses, storage means also connected to the output of the impulse forming means for storing each of the series of impulses for a time interval substantially equal to the time of one revolution of the record and then applying the stored series of impulses to the modulating means wherein the stored series of impulses are also modulated, and drive means responsive to the modulated series of impulses and adapted to be operatively connected to the recording head for changing the position of the recording head in accordance with the modulated series of impulses while the recording head is recording the sound track on the record.

In one embodiment the apparatus uses a first drive means adapted to be connected to the recording head for moving the recording head at a predetermined constant rate, and a second drive means connected to the recording head for changing the rate at which the recording head is driven by said first drive means in accordance with the amplitude of the sound track to be recorded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
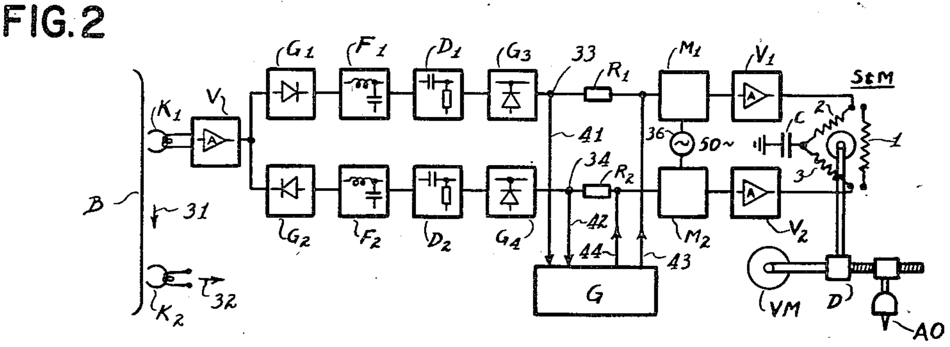
Fig. 2 is a block diagram of the electronic components of the apparatus used to carry out the method of the present invention.
Figure 3:
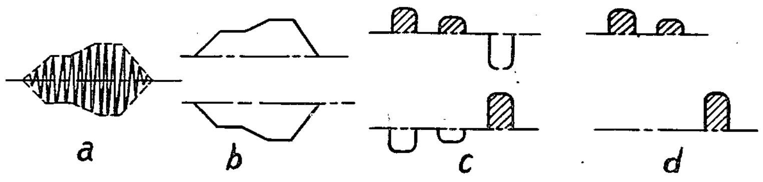
Figure 4:
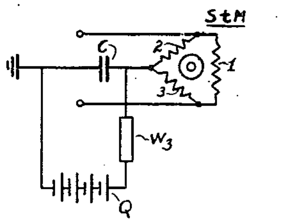
Figure 5:
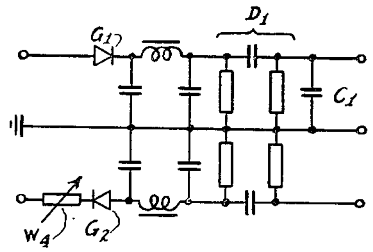
Figure 6:
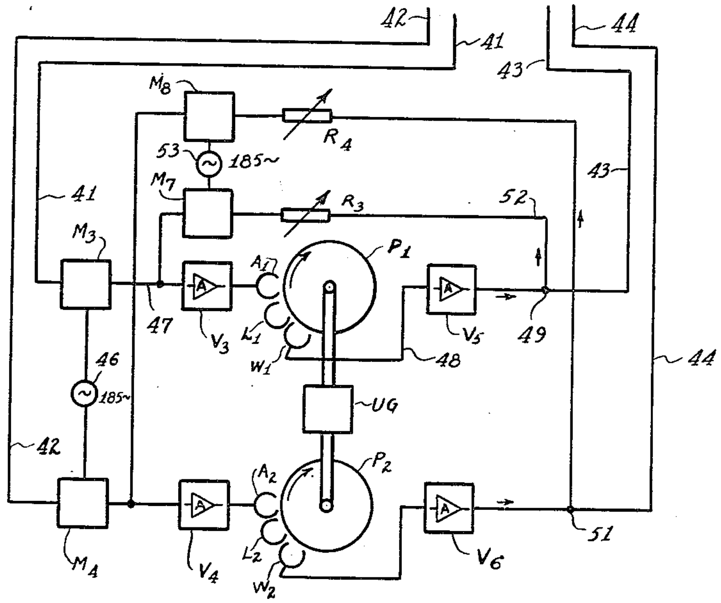
Figure 7:
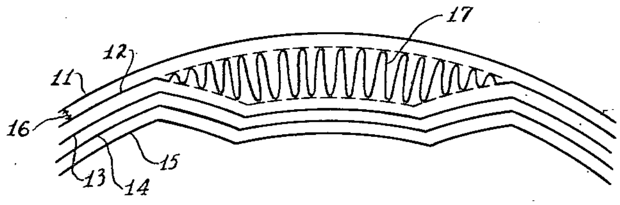

Fig. 3 including sub-Figures *3a*–*3b* shows the wave shape of the signal voltages at various parts of the circuit;

Fig. 4 shows another arrangement for connecting one of the driving motors of the recording head including means for preventing the hunting of this motor;

Fig. 5 is a schematic diagram showing the relationship of several of the electronic components indicated in block form in Fig. 2;

Fig. 6 is a schematic diagram of a storing circuit shown in block form in Fig. 2; and Fig. 7 is a plan view of a record disc showing the relationship between several of the grooves of the helix.

Figure 1:
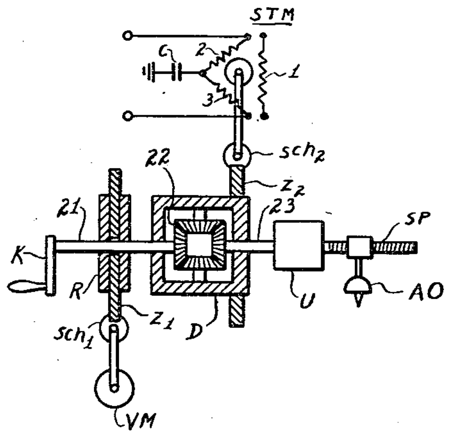
Fig. 1 is a diagrammatical representation, partially in section, of the drive means used to position the recording head.

Referring now to Fig. 1, a motor VM is shown schematically connected to a worm $Sch_1$ which meshes with a gear 21. The gear 21 is coupled to a drive shaft 21 by means of a friction coupling R. The shaft 21 is connected at one of its ends to a hand wheel K and at its other end to a sun gear 22 of a differential transmission D. The housing or spider of the differential transmission D has a gear Z2 fixedly mounted thereon which meshes with a second worm $Sch_2$ driven by a control motor *St*M.

The motor *St*M has a main winding 1 and two auxiliary windings 2 and 3, respectively. The junction point of the control windings 2 and 3 is connected to ground through a condenser C. The driven shaft 23 of the differential transmission D is connected through a reversible transmission U to a rotatable rod *Sp* on which is mounted the recording head AO.

In operation, the motor VM may be energized, by means not shown, to rotate at a desired constant rate. This turns the worm $Sch_1$, thereby rotating the gear Z1 and the drive shaft 21 at a predetermined constant rate. If the spider or housing of the differential transmission D is held stationary by the cooperation of the gear Z2 and worm $Sch_2$, the driven shaft 23 will be rotated at the same constant rate as the drive shaft 21 but in the opposite direction thereto. This is obviously accomplished by means of the planetary gears of the differential transmission D.

The rotation of the driven shaft 23 is carried through the transmission U to the rod S*p* to move the recording head AO in the desired direction. If, for example, a disc is being cut, the stylus of the recording head AO is placed near the circumference of the disc substantially perpendicular thereto. The disc is rotated at a constant rate by conventional recording equipment and the recording head AO is moved radially towards the center of the disc so that one long continuous helix is cut in the surface of the disc.

The rate of rotation of the motor VM is adjusted so that the rate of travel of the recording head AO is constant to adjust the distance between the center lines of adjacent grooves at a fixed minimum distance when no modulation is present in the sound track to be recorded. Therefore, if the control motor S*t*M is stationary the recording head AO will cut a long continuous helix travelling from the outer circumference of the disc towards the center. The length of the helix will depend on the desired distance between the center lines of the adjacent grooves and the rate of rotation of the record. The transmission U permits adjustment of the ratio between the shaft 23 and the shaft S*p* for the different speed records to be cut (i. e., 78, 45, 33⅓ R. P. M.).

When the control motor S*t*M rotates, however, the speed of the driven shaft 23 can be increased, decreased and reversed depending on the direction and the rotational speed of the gear Z2. Accordingly, by controlling the rotation of the control motor S*t*M it is possible to control the distance between the adjacent grooves of the record. In accordance with the invention, this control is automatically carried out and is dependent upon the amplitude of the sound track to be recorded and the amplitude of the sound track already recorded in the adjacent groove.

The handle K on the drive shaft 21 permits manual positioning of the recording head AO whenever desired.

Referring now to Figs. 2 and 3 the circuit for carrying out this automatic variation will be described. A magnetic tape B containing the sound tracks to be recorded moves past a reproducing head K1 in the direction of the arrow 31. The tape B simultaneously moves past a second reproducing head K2 so that the sound track that has been reproduced by the head K1 reaches the head K2 after a predetermined time interval. In the reproducing head K2 the sound track is converted into the corresponding audio frequency voltage signals and applied in the direction of the arrow 32 directly to the recording head AO where, in a known manner, it moves the stylus in the recording head AO to cut the proper pattern in the groove of the disc.

However, before the sound track reaches the recording head AO, the head must be positioned so that it will not interfere with the adjacent grooves on the record. This is the function initiated by the audio frequency signals produced in the reproducing head K1. These signals have the wave shape of the type shown in Fig. 3*a*, for example. From the reproducing head K1 the signals are amplified in an amplifier V and then split into two separate channels. The upper channel has, as its first element, a rectifier G1 which passes only the positive portions of the signal voltages. The lower channel has, as its first element, a rectifier G2 arranged in opposite polarity to the rectifier G1 so that it passes only the negative portions of the signal voltages. The outputs of the rectifiers G1 and G2 are smoothed by filters F1 and F2, respectively, so that at the output of these filters the signal voltages have the shape of the envelopes as shown in Fig. 3*b*.

The positive envelope portion of the signal voltages is differentiated in a differentiator circuit D1 which, in a manner well known in the art, provides an output only when the voltage applied thereto is changing. Therefore, the positive portion of the wave shape shown in Fig. 3*b* will produce three impulses, two positive and one negative, as shown in Fig. 3*c*. Similarly, the negative portion of the wave shape shown in Fig. 3*b* will produce three impulses, two negative and one positive. It will be noted that the space between each of the formed impulses corresponds to that portion of the wave shape in Fig. 3*b* that has a constant amplitude.

For the purposes of the present invention only the positive impulses are desired and these impulses are shown cross hatched in Fig. 3*c*. Accordingly, at the output of each of the differentiators D1 and D2 is respectively located a rectifier G3 and a rectifier G4 for eliminating the negative pulses. Therefore, at the output terminal 33 of the upper channel is produced two positive impulses shown in the upper portion of Fig. 3*d*. At the output terminal 34 of the lower channel is produced a single positive impulse, as shown in the lower portion of Fig. 3*d*.

The outputs appearing at the terminals 33 and 34 are respectively applied through decoupling resistors R1 and R2 to modulators M1 and M2. An alternating current generator 36 is provided for the modulators M1 and M2 for supplying the modulating frequency. This frequency may be 50 cycles, for example, or the equivalent supply voltage frequency.

It can be seen that the output impulses appearing at terminals 33 and 34 are simultaneously applied on conductors 41 and 42, respectively, to a storing device G whose circuit will be described later with respect to Fig. 6. The outputs of the storing device G are taken respectively on conductors 43 and 44 and also applied respectively to the modulators M1 and M2. The function of the storing circuit G is to store the impulses applied to it for a time interval substantially equal to one revolution of the disc being cut. These delayed impulses are then applied to the output conductors 43 and 44 of the storing circuit where they are also modulated by the modulators M1 and M2.

Therefore, it is seen that, at the output of each of the modulators M1 and M2, two superimposed series of modulated impulses are produced. One of the series of modulated impulses is dervied from the sound track to be recorded. The second series of modulated impulses is derived from the sound track which has already been recorded in the groove adjacent to the present groove to be cut.

The two superimposed series of modulated impulses appearing at the output of the modulator M1 are amplified in the amplifier V1 and applied to the auxiliary winding 2 of the control motor S*t*M. Similarly, the two superimposed series of modulated impulses appearing at the output of the modulator M2 are amplified in the amplifier V2 and applied to the auxiliary winding 3 of the control motor S*t*M.

The control motor S*t*M may be a conventional two-phase inductance motor with its main winding 1 connected across the power lines. Accordingly, its speed of rotation and its direction of rotation depends on the amplitude of the voltage applied to its auxiliary windings. That is, if positive voltage is applied to the winding 2, the motor S*t*M will rotate in one direction. If positive voltage is applied to the winding 3, the motor will rotate in the opposite direction. Therefore, the operation of the control motor S*t*M will move the recording head AO towards or away from the center of the disc being cut in accordance with the amplitude of the sound track to be recorded and the amplitude of the sound track already recorded in the adjacent groove of the record.

Referring now to Fig. 7 a portion of the disc to be cut is illustrated in plan view. In accordance with the invention the stylus of the recording head AO starts at the outer edge of the disc and cuts a continuous helix towards the center thereof. The distance between the adjacent groove to be cut, indicated as 16 in Fig. 7, is fixed at a desired distance and the motor VM is energized to rotate at a constant speed to drive the recording head AO towards the center of the disc so that the distance between the center lines of the adjacent grooves will be set at the minimum distance 16.

The first groove cut in the disc of Fig. 7 is indicated by the numeral 11 and in this instance no modulation is present in the sound track for that portion illustrated. However, in the groove 12 the sound track contains a modulation 17 having an amplitude substantially wider than the minimum distance 16. Accordingly, the center line of the groove 12 is shifted by the modulated impulses so that the sound track 17 will not run into the groove 11. At the end of the modulation of the sound track 17, the recording head is brought back so that the groove 12 is spaced the minimum distance 16 from the groove 11.

As can be seen in Fig. 7 the remaining grooves 13, 14 and 15 cut in the record contain no sound tracks with large modulation. Accordingly, if the groove 13 is cut by the recording head AO at the minimum distance 16 from the groove 12, it is seen that the groove 13 will run into the modulated portion 17 of the sound track in the groove 12. Therefore, when the groove 13 approaches that portion of the groove 12 containing the modulation, the recording head is moved towards the center of the disc at a time period shortly before the time corresponding to the start of the modulation 17. This movement of the recording head is continued until the maximum amplitude of the modulation 17 is reached at which time the control motor StM stops rotating and permits the minimum distance 16 to be maintained between the groove 13 and the maximum amplitude of the modulation 17.

When the amplitude of the modulation 17 starts to decrease, the recording head is moved away from the center of the disc until the modulation ends at which time the motor StM stops rotating and the groove 13 is maintained at the minimum distance 16 by the constant rotation of the motor VM.

While no modulation is present in the groove 13, it is apparent that the succeeding grooves 14, 15, etc., must also make allowance for the irregularity of the groove 13 caused by the bypassing of the modulation 17. Accordingly, as will be explained hereinafter, the cutting of the grooves 14, 15, etc. is controlled by the storing circuit G which continues to apply the required changes by means of a feedback circuit.

One circuit for carrying out the storing function is shown in Fig. 6. The positive impulses appearing at the output terminals 33 and 34 of the upper and lower channels, respectively, are applied on conductors 41 and 42, respectively to modulators M3 and M4. Modulators M3 and M4 are supplied by an alternating current supply 46 having a frequency, such as 185 cycles per second or any suitable frequency which does not contain any harmonics of the modulating frequency used with the modulators M1 and M2 of Fig. 2.

The output of the modulator M3 is taken on conductor 47, amplified in amplifier V3 and applied to a recording head A1 of a magnetic recorder. The recording head A1 magnetically records the modulated amplified positive impulses on the magnetic disc P1 which rotates at a speed equivalent to the speed of the record being cut by the recording head AO. After the disc P1 has rotated slightly less than one complete revolution, the magnetically recorded modulated impulses are picked up by the reproducing head W1 and applied on conductor 48 to an amplifier V5 where they are amplified and applied to an output terminal 49. From the output terminal 49 they are applied to the output conductor 43 and from there to the modulator M1 of Fig. 2.

It should be noted that these output stored impulses are applied slightly before a complete revolution has been made. In Fig. 7 it can be seen that the groove 13 must start to rise shortly before the start of the modulation in the groove 12. Similarly, the groove 13 returns to its normal position shortly after the end of the modulation 17. Accordingly, the series of impulses corresponding to the negative portion of the voltage signals should be applied shortly after a complete revolution of the disc being cut.

This last requirement is met in Fig. 6 in the following manner: The series of positive impulses corresponding to the negative portion of the voltage signal of the sound track are applied on conductor 42 to the modulator M4 where they are modulated and then amplified by the amplifier V4. The output of the amplifier V4 is applied to the recording head A2 which magnetically records the modulated impulses on the magnetic disc P2. It can be seen that the disc P2 is driven from the shaft rotating P1 through a transmission UG. The transmission UG is a stepdown transmission so that the speed of rotation of the disc P2 is slightly lower than the speed of rotation of the disc P1.

In the same manner as indicated above the impulses recorded on the disc P2 are picked up by the reproducing head W2, amplified in the amplifier V6 and applied to an output terminal 51 from where they are returned on conductor 44 to the modulator M2. Since the speed of rotation of the disc P2 is slightly less than the speed of rotation of the record being cut, the modulated impulses recorded by the recording head A2 will not be picked up by reproducing head W2 until shortly after a complete revolution of the disc being cut.

Between the reproducing head W1 and the recording head A1 is an erasing head L1 and a similar erasing head L2 is located between the reproducing head W2 and the recording head A2. Therefore, after the modulated impulses have been picked up by the respective heads W1 and W2 they are erased by the erasing heads L1 and L2 and the discs P1 and P2 are ready to receive the next impulses.

It can be seen that feedback circuits are also connected to the output terminals 49 and 51, respectively. From the terminal 49 to a conductor 52 applies the output impulses through an adjustable resistor R3 to a modulator M7. The modulator M7 is supplied with an alternating frequency source 53 equal to the alternating frequency supplied by the source 46. The modulated output impulses from the modulator M7 are applied to the input of the amplifier V3 where they are superimposed upon the modulated impulses emitted by the modulator M3. Therefore, the impulses actually recorded by the recording head A1 include both the impulses to be recorded as well as the impulses which have just been recorded. It is seen that this type of feedback will continue to add the fixed amount to the succeeding impulses which will cause the succeeding grooves, such as 13, 14, and 15, etc., to be moved an amount sufficient to avoid the irregularities of the previously recorded grooves.

Therefore, with the above arrangement the distance between the center lines of the adjacent grooves is automatically varied in accordance with the amplitude of the sound track to be recorded in the groove and the amplitude of the sound track recorded in the adjacent groove. Since the control motor StM works to control the movement of the recording head in both directions, it is possible for this motor to hunt back and forth about the desired position of the recording head.

Accordingly, in Fig. 4 an arrangement is shown for preventing such hunting from occurring.

In Fig. 4 the main winding 1 of the control motor StM is energized by both of the phases applied to its auxiliary winding. Across the condenser C, which is provided for insuring proper phase shift, is connected a resistor W3 in series with a direct current voltage source Q. In this arrangement, as soon as the impulses are no longer applied to the auxiliary windings 2 and 3, the main winding 1 simultaneously has no voltage applied thereacross. The direct current produced from the source Q acts as an effective eddy-current brake to insure instant stopping of the control motor StM.

Since the charging and discharging time of the negative and positive portions of the signal voltages are not always the same, it is preferable that some adjustment be made in either the upper or lower channels to be sure that the control motor positions the recording head at the desired point after all the corrective impulses have been applied thereto. In Fig. 5, an adjustable resistor W4 is shown connected in series with the rectifier G2 of the lower channel.

The resistor W4 increases the charging time constant of the rectifiers G2 of the lower channel. This is desirable since the impulse produced in the lower channel corresponding to the decrease of amplitude of the voltage signals are usually too large. In general the amplitude increases more slowly than it decreases. Accordingly, by these means the sum of the negative and positive control voltages corresponding to the increase and decrease of the voltage signals equals zero and the recording head is returned to its zero position. Similarly, the condensor C1 shown in Fig. 5 increases the charging time constant of the differentiator D1.

It will be understood that each of the elements described above, or two or more together, may also find a useful application in other types of control circuits differing from the types described above.

While the invention has been illustrated and described as embodied in a recording apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for positioning the recording head of a recording apparatus to control the distance between adjacent grooves of a record during the recording of a sound track thereon, comprising, in combination, means for producing voltage signals corresponding to the sound track to be recorded; impulse forming means responsive to said voltage signals for forming two series of impulses, one of said series of impulses corresponding to the positive portions of said voltage signals and the other of said series of impulses corresponding to the negative portions of said voltage signals, said impulse forming means having an output; modulating means connected to the output of said impulse forming means for modulating each of said series of impulses; storage means also connected to the output of said impulse forming means for storing each of said series of impulses for a time interval substantially equal to the time of one revolution of the record and then applying the stored series of impulses to said modulating means wherein the stored series of impulses are also modulated; and drive means responsive to the modulated series of impulses and connected to the recording head for changing the position of the recording head in accordance with the modulated series of the impulses while the recording head is recording the sound track on the record.

2. Apparatus for positioning the recording head of a recording apparatus to control the distance between adjacent grooves of a record during the recording of a sound track thereon, comprising, in combination, generating means for producing voltage signals corresponding to the sound track to be recorded, said generating means having an output; a first impulse forming means connected to the output of said generating means for forming a series of impulses corresponding to the positive portions of said voltage signals, said first impulse forming means having an output; second impulse forming means connected to the output of said generating means for forming a series of impulses corresponding to the negative portions of said voltage signals, said second impulse forming means having an output; modulating means connected to the outputs of said impulse forming means for modulating each of said series of impulses; storage means also connected to the outputs of said impulse forming means for storing each of said series of impulses for a time interval substantially equal to the time of one revolution of the record and then applying the stored series of impulses to said modulating means wherein the stored series of impulses are also modulated; and drive means responsive to the modulated series of impulses and connected to the recording head for changing the position of the recording head in accordance with the modulated series of impulses while the recording head is recording the sound track on the record.

3. Apparatus for positioning the recording head of a recording apparatus to control the distance between adjacent grooves of a record during the recording of a sound track thereon, comprising, in combination, means for producing voltage signals corresponding to the sound waves of the sound track to be recorded; impulse forming means responsive to said voltage signals for forming two series of impulses, one of said series of impulses corresponding to an increasing intensity of said sound waves and the other of said series of impulses corresponding to a decreasing intensity of sound waves, said impulse forming means having an output; modulating means connected to the output of said impulse forming means for modulating each of said series of impulses; decoupling means connected between the output of said impulse forming means and said modulating means; storage means also connected to the output of said impulse forming means for storing each of said series of impulses for a time interval substantially equal to the time of one revolution of the record and then applying the stored series of impulses to said modulating means wherein the stored series of impulses are also modulated; and drive means responsive to the modulated series of impulses and connected to the recording head for changing the position of the recording head in accordance with the modulated series of impulses while the recording head is recording the sound track on the record.

4. In an apparatus for positioning the recording head of a recording apparatus during the recording of a sound track on a record in combination, first drive means connected to the recording head for moving the recording head at a predetermined constant rate; and a second drive means connected to the recording head for changing the rate and direction at which the recording head is driven in accordance with the amplitude of the sound waves of the sound track to be recorded.

5. Apparatus for positioning the recording head of a recording apparatus to control the distance between adjacent grooves of a record during the recording of a sound track thereon, comprising, in combination, means for producing voltage signals corresponding to the sound waves of the sound track to be recorded; impulse forming means responsive to said voltage signals for forming two series of impulses, one of said series of impulses corresponding to an increasing intensity of said sound waves and the other of said series of impulses corresponding to a decreasing intensity of said sound waves, said impulse forming means having an output; a first drive means connected to the recording head for moving the recording head at a predetermined constant rate with respect to the record being cut; and a second drive means responsive to said series of impulses and connected to the recording head for changing the rate and direction at which the recording head is driven by the first drive means in accordance with said series of impulses while the recording head is recording the sound track on the record.

6. In an apparatus for positioning the recording head of a recording apparatus during the recording of a sound track on a record in combination, a differential transmission connected to the recording head; a first motor connected to said differential transmission and adapted to rotate at a constant speed to move the recording head at a predetermined constant rate with respect to the record; and a second motor connected to said differential transmission for changing the rate and direction at which the recording head is moved by the first motor in accordance with the amplitude of the sound track to be recorded.

7. Apparatus for positioning the recording head of a recording apparatus to control the distance between adjacent grooves of a record during the recording of a sound track thereon, comprising, in combination, means for producing voltage signals corresponding to the sound track to be recorded; impulses forming means responsive to said voltage signals for forming two series of impulses, one of said series of impulses corresponding to the positive portions of said voltage signals and the other of said series of impulses corresponding to the negative portions of said voltage signals, said impulse forming means having an output; modulating means connected to the output of said impulse forming means for modulating each of said series of impulses; storage means also connected to the output of said impulse forming means for storing each of said series of impulses for a time interval substantially equal to the time of one revolution of the record and then applying the stored series of impulses to said modulating means wherein the stored series of impulses are also modulated; a differential transmission adapted to be connected to the recording head; a first motor connected to said differential transmission and adapted to rotate at a constant speed to move the recording head at a predetermined constant rate; and a second motor connected to said differential transmission for changing the rate and direction at which the recording head is moved by the first motor in accordance with the modulated series of impulses while the recording head is recording the sound track on the record.

8. Apparatus for positioning the recording head of a recording apparatus to control the distance between adjacent grooves of a record during the recording of a sound track thereon, comprising, in combination, means for producing voltage signals corresponding to the sound track to be recorded; impulse forming means responsive to said voltage signals for forming two series of impulses, one of said series of impulses corresponding to the positive portions of said voltage signals and the other of said series of impulses corresponding to the negative portions of said voltage signals, said impulse forming means having an output; modulating means connected to the output of said impulse forming means for modulating each of said series of impulses; storage means also connected to the output of said impulse forming means for storing each of said series of impulses for a time interval substantially equal to the time of one revolution of the record and then applying the stored series of impulses to said modulating means wherein the stored series of impulses are also modulated; a differential transmission adapted to be connected to the recording head; a first motor connected to said differential transmission and adapted to rotate at a constant speed to move the recording head at a predetermined constant rate; a second motor connected to said differential transmission for changing the rate and direction at which the recording head is moved by the first motor in accordance with the modulated series of impulses while the recording head is recording the sound track on the record; and means for preventing hunting of said second motor.

9. In an apparatus for positioning the recording head of a recording apparatus during the recording of a sound track on a record in combination, a differential transmission adapted to be connected to the recording head; a first motor connected to said differential transmission and adapted to rotate at a constant speed to move the recording head at a predetermined constant rate; a second motor connected to said differential transmission for changing the rate and direction at which the recording head is moved by the first motor in accordance with the amplitude of the sound track to be recorded; and means for preventing hunting of said second motor.

References Cited in the file of this patent

UNITED STATES PATENTS

| | | |
|---|---|---|
| 2,112,699 | Kleber | Mar. 29, 1938 |
| 2,611,038 | Graham | Sept. 16, 1952 |
| 2,674,660 | Ambrose | Apr. 6, 1954 |